United States Patent [19]

Bachmann et al.

[11] Patent Number: 4,764,010

[45] Date of Patent: Aug. 16, 1988

[54] METHOD FOR ALIGNING THE AXIS OF A SECOND BRACKET RELATIVE TO THE AXIS OF A FIRST BRACKET ON A TESTING OR PROCESSING MACHINE

[75] Inventors: Volker Bachmann, St. Augustin; Hubert Döker, Bonn, both of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 900,415

[22] Filed: Aug. 26, 1986

[30] Foreign Application Priority Data

Aug. 31, 1985 [DE] Fed. Rep. of Germany ....... 3531156

[51] Int. Cl.$^4$ ............................................. G01B 11/26
[52] U.S. Cl. .................................. 356/153; 356/154; 33/286; 33/DIG. 21
[58] Field of Search ............... 356/153, 154, 138, 155; 33/286, DIG. 21

[56] References Cited

U.S. PATENT DOCUMENTS 3,951,551  4/1976  Macpherson ..................... 356/155
4,142,299  3/1979  Alsina ........................... 33/DIG. 21
4,566,202  1/1986  Hamar ............................. 33/286

FOREIGN PATENT DOCUMENTS 885801  11/1981  U.S.S.R. ............................ 356/138

Primary Examiner—Bruce C. Anderson
Assistant Examiner—Jack I. Berman
Attorney, Agent, or Firm—Spensley Horn Jubas & Lubitz

[57] ABSTRACT

On a testing or processing machine the axis of a second bracket is to be exactly aligned relative to the axis of a first bracket. For this purpose a laser is mounted on the first bracket which directs a beam onto the reflector surface of a disc mounted on the second bracket. The reflected beam produces a dot of light on the perforated disc, which is arranged about the exit aperture of the light source. By adjusting the second bracket the dot of light is directed onto the aperture. Once this is done the two brackets are in exact alignment. To align brackets arranged at an angle to each other a beam deflecting device can be arranged in the path of the beam. All the auxiliary devices needed for measurement can likewise be exactly adjusted in accordance with the method.

17 Claims, 2 Drawing Sheets

METHOD FOR ALIGNING THE AXIS OF A SECOND BRACKET RELATIVE TO THE AXIS OF A FIRST BRACKET ON A TESTING OR PROCESSING MACHINE

The invention relates to a method and apparatus for relatively aligning brackets on a testing or processing machine.

When operating a uniaxial or multi-axial testing or processing machine it is necessary to clamp the test piece or workpiece in place so that no undesirable additional load is produced, e.g. due to bending. This means that the brackets provided on the machine for the test piece or for the workpiece and tool have to be arranged exactly along defined axes. The tolerances usual in mechanical engineering applications cannot guarantee such an exact alignment. It is known to gauge testing or processing machines with the aid of telescope and alignment sights in order to bring the brackets into the particular position and alignment desired using fine adjustments. In addition such measurements may be effected by mechanical means such as a hairline straight-edge, angle gauges and dial gauges. It is very laborious to take measurements by mechanical means or with alignment sights, since while the adjustment are being made on the machine frame there is no display that can be directly read off. Only after an adjustment operation involving a series of individual measurements has been carried out is information provided about the correction that has been made.

The problem underlying the invention is to provide a method and apparatus for relatively aligning brackets on a testing or processing machine which allows the axes of the brackets to be aligned exactly using simple means and in which measurement and adjustment can be carried out simultaneously, thereby making it immediately evident at each adjustment operation whether the alignment is being improved or impaired.

In accordance with the invention this problem is solved with the features of the charcterising portion of claim 1.

According to the invention a light source is mounted on the first bracket which casts a sharply focused beam onto the disc mounted on the second bracket. The second bracket is displaced in such a way that the light beam is incident exactly on the point of intersection of the axis of the second bracket with the disc. By this means it is first of all ensured that the light beam intersects the axis of the second bracket in the plane of the disc. It still remains to align the axis of the second bracket with the axis of the light beam. This is done by reflecting the beam from the small reflector surface in the middle of the disc onto the perforated disc of the first bracket. If the reflected beam strikes the perforated disc outside the aperture the axes of the two brackets are not properly aligned. In this case the second bracket is pivoted about the centre of the reflector surface so that the dot of light produced by the reflected light beam on the perforated disc falls exactly into the exit aperture of said beam, thus causing the beam to become reflected in itself. Once this adjustment has been made, the second bracket with its axis is in exact alignment relative to the axis of the first bracket in terms of both displacement and angle.

The term "alignment" is intended to cover not only the case where the axes of the two brackets coincide exactly, but also the case where said axes intersect each other at a defined angle.

It is a pre-requisite for carrying out one embodiment of the present invention that the beam emitted by the light source coincides exactly with the axis of the first bracket. This congruence of the beam and the axis of the first bracket can be achieved by fixing the light source on the first bracket with very small measurement tolerances, i.e. very precisely. However, it is often not possible to use small measurement tolerances to affix the light source in such a precise manner. It is therefore useful to employ the steps of an alternative embodiment to first align the axis of the beam with the axis of the first bracket. In a preferred embodiment of this method, according to which two projection screens or one displaceable screen is used to first align the light beam by rotating the first bracket in such a way that the light beam passes parallel to the axis of the first bracket, and then displace the light source in parallel direction until the beam of light and the axis exactly coincide.

In similar fashion the reflector surface is aligned at right angles to the axis of the second bracket, in that in accordance with another embodiment the second bracket is rotated about its axis and the accompanying circular movement of the dot of light produced on the performated disc is reduced to a fixed dot.

One embodiment of the invention will now be explained in more detail as follows with reference to the drawings.

Figure 1:
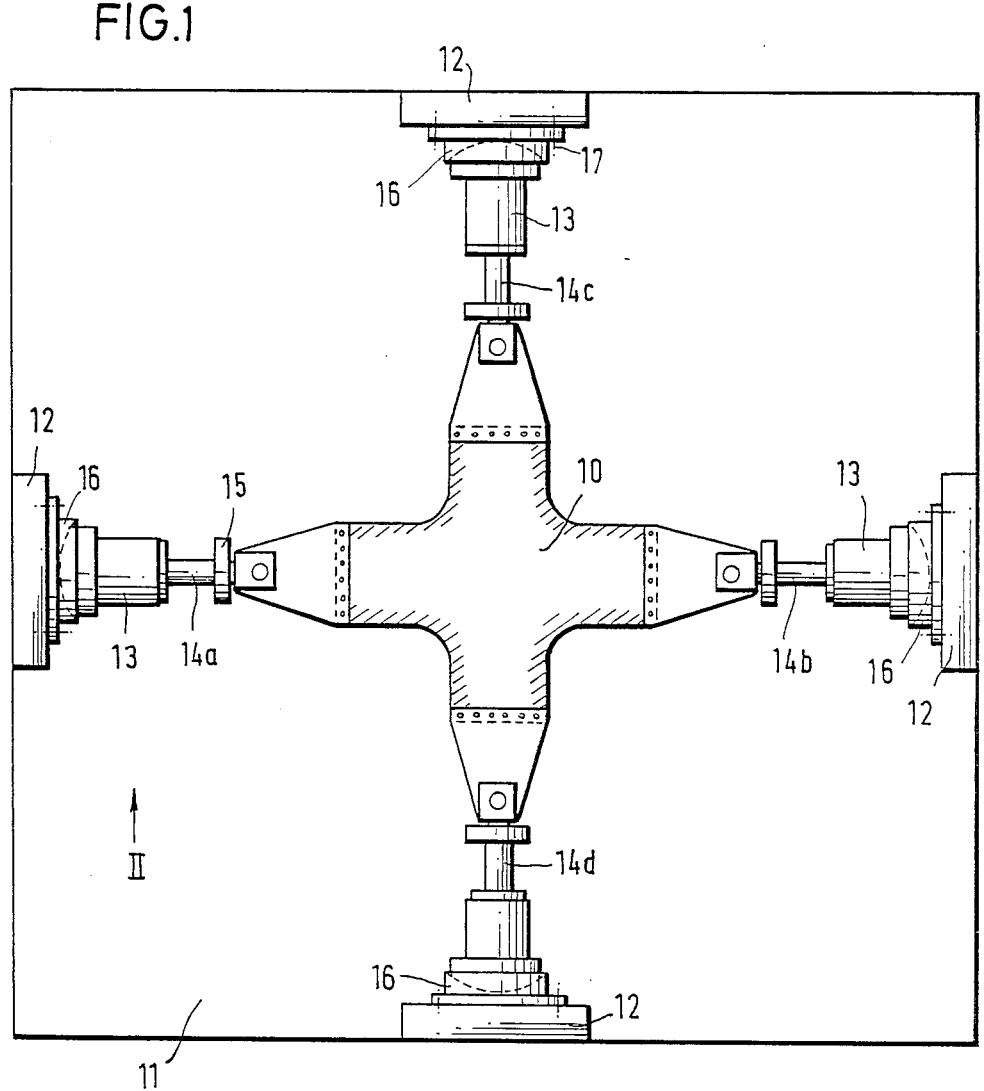
FIG. 1 shows a schematic top view of a testing machine whose brackets with their axes are to be aligned relative to each other.
Figure 2:
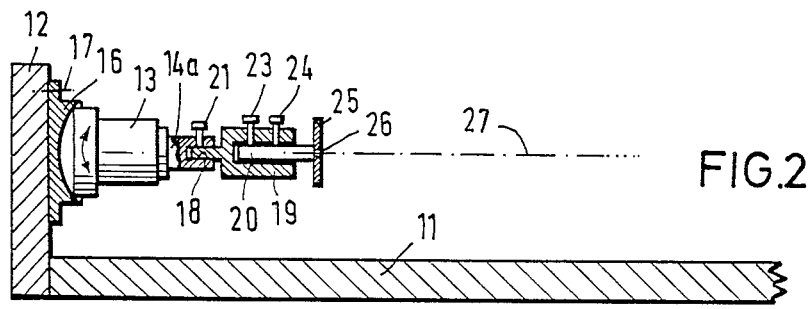
FIG. 2 shows a partial side view of FIG. 1 from the direction of the arrow II.

The machine illustrated in FIGS. 1 and 2 is a materials testing machine which exerts continuous or alternating tensile stresses on a test piece 10. The testing machine has a rigid thick-walled base plate 11 on which are mounted vertical pillow blocks 12. Each of the pillow blocks 12 supports a hydraulic ram-cylinder unit 13, the connecting rod of which forms the bracket 14, on which one end of the test piece 10 can be affixed by means of a mounting device 15. The cylinder of each ram-cylinder unit 13 is mounted at its rear extremity on a spherical bearing 16 whose centre lies on the axis of the bracket 14 and which can be tightened by clamping means (not shown) so as to lock the swivel of the ram-cylinder unit. Each bearing 16 is secured by screws 17 on the associated pillow block 12 so that when the screws 17 are slackened the ram-cylinder unit 13 can be moved in parallel direction and then locked once more.

In the present embodiment four brackets, 14a,14b,14c and 14d are provided, with brackets 14a and 14b and brackets 14c and 14d respectively opposed to each other. With the brackets aligned with each other the coincident axes of brackets 14a and 14b form a cross jointly with the axes of brackets 14c and 14d, which likewise coincide, and the arms of this cross intersect at right angles at the centre of the testing apparatus.

As FIG. 2 shows, the bracket 14a has a recess 18 at its front extremity to enable the mounting device 15 to be affixed. However, in FIG. 2 the mounting device 15 has been removed and replaced by a holding fixture 19 for a light source 20 in the form of a laser. The holding fixture 19 is locked in the recess 20 by a screw 21. It has two planes of adjustment. In each plane of adjustment at least three screws 23,24 are distributed circumferentially. The ends of these screws press against the housing of the light source 20 in order to position the light source inside the holding fixture 19. The front end of the light source 20 projects axially from the holding fixture 19. At the front end of the light source 20 the perforated disc 25 is secured, from the aperture 26 in which the beam 27 emitted by the laser emerges at right angles to the plane of the perforated plate.

Figure 3:
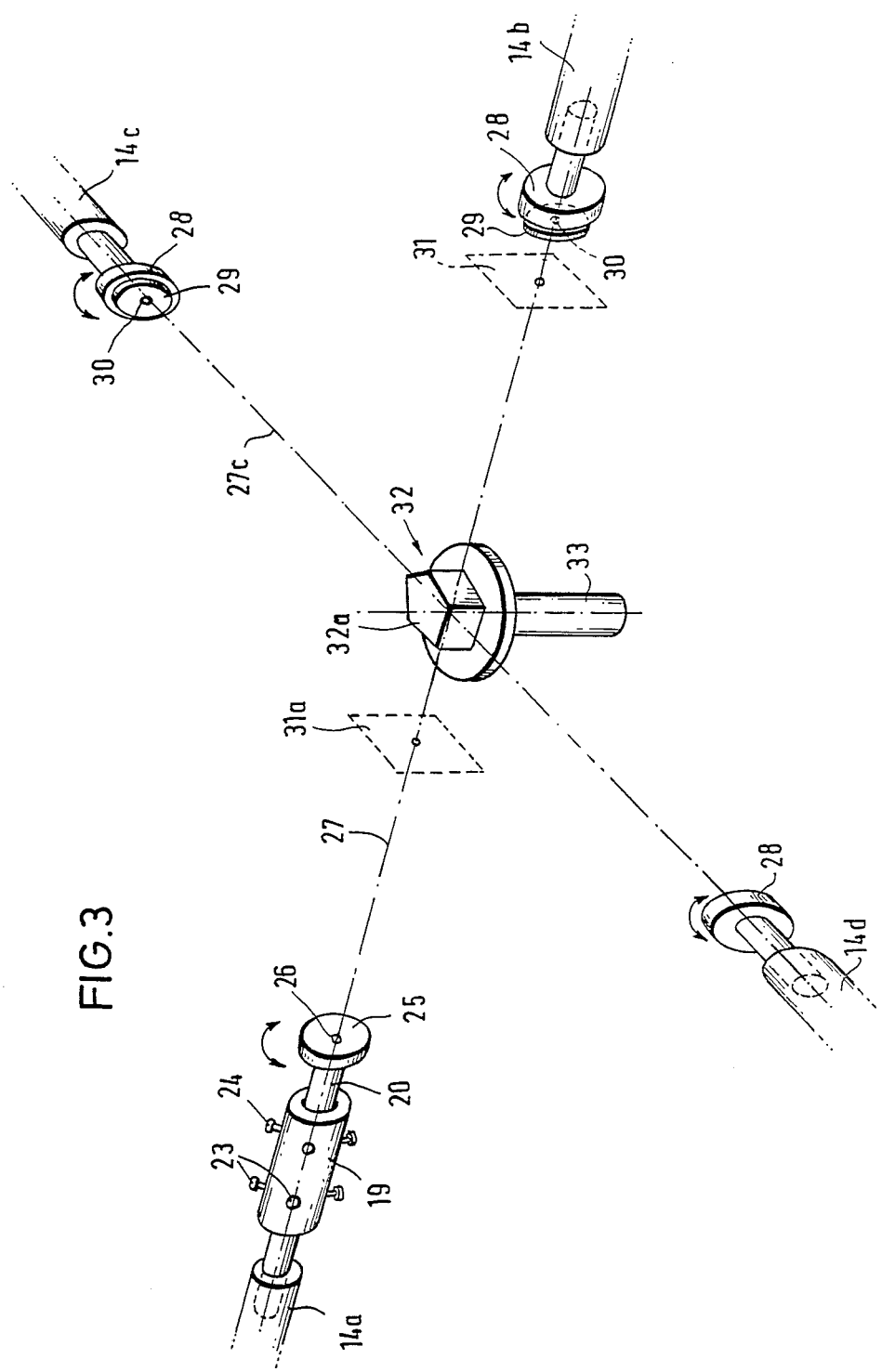
FIG. 3 is a diagram illustrating the method of alignment.

For the axial alignment of the second bracket 14b relative to the first bracket 14a, a disc 28 is mounted on the second bracket 14b in accordance with FIG. 3, the front side of this disc being designed as a reflector surface. In front of the disc 28 is arranged a perforated mask 29 exhibiting a central aperture 30 which leaves a small portion of the reflector surface uncovered.

Let us assume in the first place that the axis of the light source 20 is in exact alignment with the axis of the first bracket 14a, that the aperture 30 in the perforated mask 29 lies exactly on the axis of the second bracket 14, and that furthermore the reflector surface of the disc 28 is exactly at right angles to the axis of the second bracket 14b. This means that the auxiliary devices mounted on the first bracket 14a and on the second bracket 14b are exactly aligned with the axis of the respective bracket. With this condition satisfied the axis of the second bracket 14b will now be brought into alignment with the axis of the first bracket 14a. For this the beam deflecting device 32 additionally shown in FIG. 3 is not at first in position.

If the second bracket 14b is not in exact alignment, the sharply focused beam 27 emitted by the light source 20 does not strike the aperture 30, but the surface of the perforated mask 29. By parallel displacement of the associated spherical bearing 16 on the pillow block 12, the second bracket 14b is positioned in such a way that the beam 27 falls exactly into the aperture 30 in the perforated mask 29. In this manner the axis of the second bracket 14b is first made to intersect the beam of light in the aperture 30.

That portion of the reflector surface of the disc 28 located behind the aperture 30 reflects the incident beam 27. If the reflected beam does not strike the aperture 26 in the perforated disc 25 exactly, the angle of the second bracket 14b must be adjusted. This is done by slackening the tension in the spherical bearing 16 so that the ramcylinder unit 13 of the second bracket 14b can be swivelled until the reflected beam strikes the aperture 26 exactly. The spherical bearing 16 is locked in that position once more. The two axes 14a and 14b are then so aligned with each other that they coincide.

When the method is being implemented the dot of light from the laser beam is visible in each case on the perforated disc 25 and the perforated plate 29. In other words the direction in which the linear or angular correction has to be made can be clearly seen. Thus the size of the deviation still remaining can be exactly ascertained while the correction is being carried out. The dot of light forms, as it were, an analogue display of the size of the misalignment that still remains. The spherical joint 16 of the second bracket 14b is preferably so designed that its centre at least approximately coincides with the aperture 30 in the perforated plate 29 fixed on the disc 28.

In the description of the method so far it has been assumed that the auxiliary devices mounted on the brackets 14a and 14b are in exact alignment with the respective bracket. There follows a description of how these auxiliary devices are brought into alignment with the axes of the brackets.

Before the method described above is implemented a projection screen 31, e.g. a plate, is set up in the path of the beam 27. The perforated plate 29 may also be used as the projection screen. The first bracket 14a is then rotated about its axis. If this causes the image to describe a circle on the projection screen 31 the beam 27 is not passing exactly on the rotational axis of the first bracket 14a. This bracket can quite easily be rotated since the bracket forms the connecting rod of the piston in the ram-cylinder unit 13. This piston can be rotated in the associated cylinder.

In order to establish whether the misalignment is parallel or angular a projection screen 31a is arranged a short distance from the light source 20 and the first bracket 14a is in turn rotated about its axis by 360°. If the circles produced by the dot of light in turn on both projection screens 31 and 31a are the same size, the light source 20 need now only be moved in parallel direction inside the holding fixture 19 until the dot remains fixed and no longer describes a circle when the first bracket 14a is subsequently rotated by 360°. If the diameters of the circles on the projection screens 31 and 31a are different, the angle of the light source 20 is altered by adjusting screws 23 or 24 until the circles on both projection screens have the same diameter. Once this has been done, the screws 23 and 24 are adjusted so as to provide the required degree of parallel displacement of the light source 20. In this way the beam of light is aligned with the axis of the first bracket 14a.

It may be necessary to adjust the disc 28 so that it lies exactly at right angles to the axis of the second bracket 14b. This involves removing the perforated mask 29 to uncover the entire reflector surface of the disc 28. The beam 27 is directed onto the reflector surface and from there reflected onto the perforated disc 25 or onto a projection screen placed in the path of the reflected beam. If the second bracket 14b is now rotated about its axis by 360°, the image of the reflected beam describes a circle on the perforated disc 25 (or the projection screen) if the disc 28 is not properly aligned. The disc 28 on the second bracket 14b can now be aligned in the same manner as described above by means of alignment of the light source 20 relative to the first bracket 14a. For the sake of clarity the adjusting means for altering the position of the disc 28 relative to the first bracket 14b are not shown in the drawing.

Once the outlined adjustments have been made, the method described above for aligning the axis of the second bracket 14b relative to the axis of the first bracket 14a can be carried out.

There now follows a description of how the second bracket 14c is aligned at right angles to the first bracket 14a. For this the beam deflecting device 32, for example a pentagonal prism, is arranged in the region of the intended point of intersection of the two axes. The beam deflecting device 32 is mounted on an adjustable column 33. A pentagonal prism possesses the characteristic that it deflects at right angles a beam incident on, say, the centre of one lateral face 32a. The beam 27 should strike the face 32a more or less perpendicularly, but even if there are minor deviations from this said beam is deflected at exactly right angles. When the beam deflecting device 32 has been arranged in the manner described, the second bracket 14c is aligned at right angles to the axis of the first bracket 14a in the same manner as was outlined above for the linear alignment of the bracket 14b with the aid of the disc 28 and the perforated mask 29. The positioning of the disc 28 at right angles to the axis of the bracket 14c is also carried out in the manner described above.

Before making these adjustments it is helpful to adjust the support 33 or beam deflecting device. For this a projection screen, which may also be the diaphragm 29, is set up in the path of the deflected beam 27c. Since there is partial deflection at the face 32a, a weak image is produced on the perforated disc 25 if the face 32a is not at exactly right angles to the incident beam 27. The column 33 is now adjusted so that the weak dot of light disappears in the aperature 26. The emerging light beam 27c then needs only to be adjusted in the vertical plane, which is done by tilting the column 33 about the axis of the incident beam 27. This satisfies the conditions for adjustment of the disc 28 relative to the bracket 14c and for carrying out the adjustment of the bracket 14c relative to the bracket 14a.

It is not absolutely necessary to use a beam deflecting device 32 to deflect the beam by 90°, instead a beam deflecting device with a different angle of deflection may be employed so long as the second bracket 14c is to be at a corresponding angle to the first bracket 14a.

Adjustment of the bracket 14d is then carried out in the same way as adjustment of the bracket 14c, remembering that the beam deflecting device 32 must of course be turned so that the emergent beam 27c is now directed at the bracket 14d.

The method according to the invention makes use of simple and easily understood means to produce a constant analogue signal by means of a light display which allows the user to recognize the corrections that have been made immediately during the alignment operation.

We claim:

1. A method for the alignment of the axis of a second bracket relative to the axis of a first bracket on a testing or processing machine, comprising the steps of:
    mounting a light source for producing a sharply focused beam on the first bracket in such a way that its beam passes at right angles along the axis of the first bracket through a perforated disc likewise mounted on the first bracket,
    mounting a disc on the second bracket in a plane running at right angles to the axis of said second bracket, said disc uncovering a small reflector surface on the axis of said second bracket,
    moving the second bracket parallel to its axis until the beam strikes the reflector surface, and
    swivelling the second bracket about the reflector surface until the beam is reflected in itself and no longer produces a patch of light on the perforated disk.

2. The method of claim 1, further comprising the steps of:
    linearly aligning the beam with the axis of the first bracket by placing a projection screen in the path of the beam, on which the beam produces a dot of light,
    rotating the first bracket about its axis, and
    adjusting the light source on the first bracket so that when said bracket is rotated the dot of light remains at the same pont on the projection screen.

3. The method of claim 1, further comprising the steps of:
    placing at a first distance from the light source a first projection screen,
    placing at a second distance, smaller than the first distance, a second projection screen,
    rotating the first bracket about its axis,
    swivelling the light source until the circles described on the two projection screens by the image of the beam are the same size, and
    displacing the light source on the first bracket parallel to its axis until the dot of light remains stationary on the projection screen when the first bracket is rotated.

4. The method of claim 1 further comprising the steps of:
    aligning the reflector surface at right angles to the axis of the second bracket,
    directing the beam onto the reflector surface,
    rotating the second bracket about its axis, and
    adjusting the reflector surface on the second bracket in such a way that the dot of light from the reflected beam remains at the same point on the perforated disc when said bracket is rotated.

5. The method of claim 1 wherein said disc mounted on said second bracket is a detachable perforated disc which is placed in front of the reflector surface and leaves uncovered the small reflector surface.

6. The method of claim 1 further comprising the steps of:
    placing a beam deflecting device in the path of the beam between said brackets, said brackets being arranged at an angle to each other, said beam deflecting device being mounted on an adjustable column, and
    adjusting the column in such a way that the beam partly reflected by the beam deflecting device falls back into the aperture in the perforated disc.

7. An apparatus for the alignment of the axes of a first and second bracket to be used for mounting a work piece, comprising:
    a light source mounted on said first bracket for producing a focused light beam along the axis of said first bracket;
    a first perforated disk having a substantially planar surface mounted between said light source and said second bracket;
    a reflective disk mounted on said second bracket having a substantially planar, reflective surface, whereby said light beam may be reflected back toward said first perforated disk; and
    a second perforated disk disposed in front of said reflective disk.

8. An apparatus as claimed in claim 7 further comprising means for adjusting said first perforated disk so that said beam passes through said perforation at a right angle to the planar surface of said perforated disk.

9. An apparatus as claimed in claim 7 further comprising means for adjusting said reflective disk so that said planar reflective surface is at right angles to the axis of said second bracket.

10. An apparatus as claimed in claim 7 wherein one of said bracket comprises means for angular and linear adjustment, whereby the axes of each of said brackets may be aligned.

11. An apparatus as claimed in claim 7 further comprising a projection screen placed between said first perforated disk and said second bracket whereby said light beam forms a dot image on said screen.

12. An apparatus for the alignment of the axes of at least 2 or more brackets to be used for mounting a workpiece, comprising:

a light source for producing a focused light beam mounted on a first bracket;

a first perforated disk having a substantially planar surface mounted along the axis of said first bracket between a second bracket and said light source;

means for deflecting said light beam at a predetermined angle, located between said first and second brackets;

one or more reflective disks, at least one of which is mounted on said second bracket, said reflective disks having substantially planar reflective surfaces, whereby said light beam may be reflected back toward said first perforated disk; and a second perforated disk disposed in front of said reflective disk mounted on said second bracket.

13. A method for aligning axes of a first and second bracket to be used for mounting a work piece, comprising the steps of:

providing an apparatus comprising:
a light source mounted on said first bracket for producing a focused light beam, a first perforated disk having a substantially planar surface mounted between said light source and said second bracket, a reflective disk having a substantially planar reflective surface mounted on said second bracket for reflecting said light beam back toward said perforated disk and a second perforated disk disposed in front of said reflective disk;

aligning said light beam with said axis of said first bracket;

adjusting said first perforated disk so that said light beam passes through said perforation at a right angle to the planar surface of said first perforated disk;

adjusting said reflective disk so that said planar reflective surface is perpendicular to said axis of said second bracket; and adjusting said second bracket so that said light beam strikes said reflective surface and is reflected back into said perforation of said first perforated disk.

14. A method for aligning axes of a first and second bracket to be used for mounting a work piece, comprising the steps of:

providing an apparatus comprising:
a light source mounted on said first bracket for producing a focused light beam, a perforated disk having a substantially planar surface mounted between said light source and said second bracket, and a reflective disk having a substantially planar reflective surface mounted on said second bracket for reflecting said light beam back toward said perforated disk;

aligning said light beam with said axis of said first bracket;

adjusting said perforated disk so that said light beam passes through said perforation at a right angle to the planar surface of said perforated disk;

adjusting said reflective disk so that said planar reflective surface is perpendicular to said axis of said second bracket;

adjusting said second bracket so that said light beam strikes said reflective surface and is reflected back into said perforation of said perforated disk;

wherein said step of adjusting said perforated disk further comprises the steps of:

providing first and second projection screens between said light source and said second bracket whereby said light beam forms a dot image on each of said screens; and rotating said first bracket about its axis until said light beam circumscribes an equal area on each of said projection screens.

15. A method as claimed in claim 13 wherein said step of aligning said light beam along said axis of said first bracket further comprises the steps of:

providing a projection screen between said light source and said second bracket whereby said light beam forms a dot of light on said screen, adjusting said light source so that when said first bracket is rotated about its axis said dot of light remains at the same point on said projection screen.

16. A method as claimed in claim 13 wherein said step of adjusting said planar reflective surface perpendicular to said axis of said second bracket further comprises the steps of:

forming a dot image with said reflected light beam onto a surface;

rotating said second bracket about its axis; and adjusting said reflective disk so that said dot image remains fixed at a point when said second bracket is rotated about its axis.

17. A method for positioning the axes of a first and second bracket at any predetermined angle of incidence, comprising the steps of:

providing an apparatus comprising:
a light source mounted on said first bracket for producing a focused light beam, a first perforated disk having a substantially planar surface mounted between said light source and said second bracket, a reflective disk having a substantially planar reflective surface mounted on said second bracket for reflecting said light beam back toward said first perforated disk, a second perforated disk disposed in front of said reflective disk, and means for deflecting said light beam at a predetermined angle located between said brackets;

aligning said light beam with said axis of said first bracket;

adjusting said first perforated disk so that said light beam passes through said perforation at a right angle to the planar surface of said first perforated disk;

positioning said deflecting means in the area of intersection of said axes, whereby said light beam is deflected toward said second bracket;

adjusting said reflective disk so that said planar reflective surface is perpendicular to said axis of said second bracket; and adjusting said second bracket so that said deflected light beam strikes said reflective surface and is reflected back into the perforation of said first perforated disk.

* * * * *